No. 700,186. Patented May 20, 1902.
B. C. W. EVANS.
WHEEL OR RAIL TREAD.
(Application filed Dec. 2, 1901.)

(No Model.)

WITNESSES:
William B. Thomas
S. Olivia Moore

INVENTOR
Burr C. W. Evans.
BY
Edwin Guthrie,
ATTORNEY

UNITED STATES PATENT OFFICE.

BURR CHAS. WM. EVANS, OF NEW YORK, N. Y.

WHEEL OR RAIL TREAD.

SPECIFICATION forming part of Letters Patent No. 700,186, dated May 20, 1902.

Application filed December 2, 1901. Serial No. 84,447. (No model.)

*To all whom it may concern:*

Be it known that I, BURR CHARLES WILLIAM EVANS, a citizen of the United States, residing at New York, in the county of New York and State of New York, have invented certain new and useful Improvements in Wheel or Rail Treads; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to wheel and rail tread formations, and has for its object the production of a specially-constructed bearing-surface for a railway-car wheel or for the upper portion of a railway-rail that will most effectively prevent slipping and avoid the necessity for sanding the track, a practice commonly resorted to at present, and that will, furthermore, enable the car or train of cars to be easily and promptly retarded by the application of a minimum braking friction, even upon a downgrade.

Each constituent element of my invention is described in detail and its individual office, together with the mode of operation of the whole, fully explained hereinafter.

Figure 1:
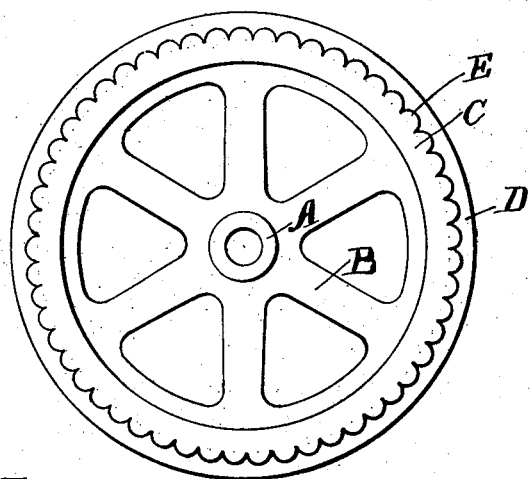
Figure 2:
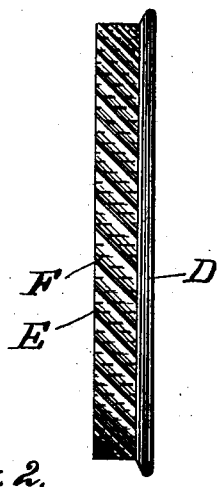
Figures 3, 6:
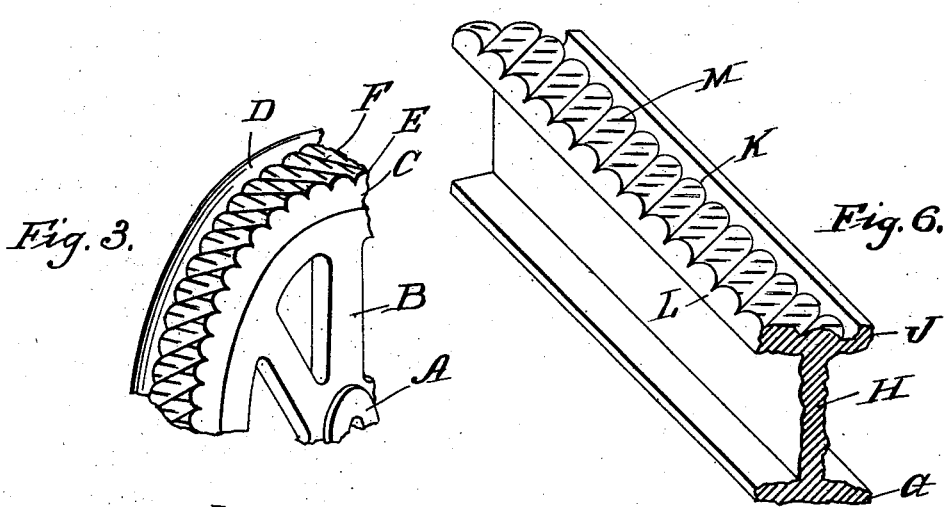
Figures 4, 5:
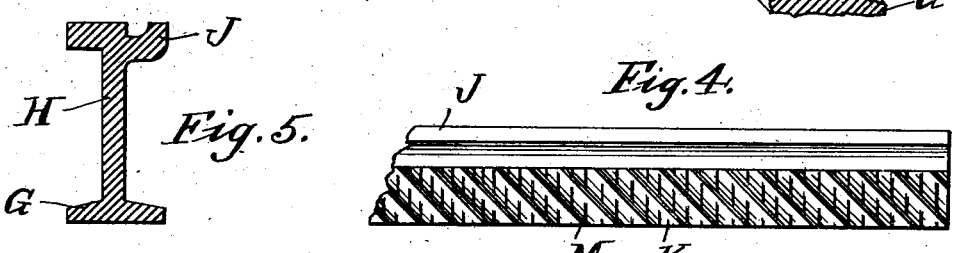

Of the accompanying drawings, throughout which like letters refer to like parts, Figure 1 represents a side view of a railway-car wheel constructed in accordance with my invention, and Fig. 2 shows an edge view of the same or a like wheel. Fig. 3 is a perspective view of a quadrantal portion of the tire or tread of a wheel, showing the form and arrangement preferred for the corrugations and milling formations. Fig. 4 represents a plan view of the tread of a railway-rail constructed in accordance with my invention. Fig. 5 shows a cross-section of the same or a like rail; and Fig. 6 is a perspective representation of a portion of the tread of a rail, exhibiting the preferred form of corrugations and the arrangement of the same with the milling applied to them.

Considering the drawings, letter A designates the hub of a railway-car wheel; letter B, its spokes; letter C, its tire portion, and letter D the customary flange. I do not desire to limit myself to the particular style or type of railway-wheel delineated, neither do I restrict the scope of my invention to railway-wheels alone, as the same construction, very slightly modified, could be usefully applied to many self-propelled vehicles for ordinary road travel or traction uses. (See Figs. 1, 2, and 3.)

My invention consists in constructing the tire portion C of the wheel, so far as relates to its tread, of parts of cylindrical or like surfaces arranged contiguously, as shown, and disposed diagonally across the tread-surface, usually at an angle of forty-five degrees. The part-cylindrical protuberances are marked E. On the same wheel they are all alike; but I believe it to be within the purview of my invention to make these part-cylindrical rises of any chosen size, length, or curvature, having in view the special purpose and conditions for which the wheel is constructed and under which it is to be employed.

To explain the diagonal arrangement of the part-cylinders, it may be observed that if these protuberances were arranged directly across the tread of the wheel the result would be a continuous jolting as the car proceeded; but as they are disposed slantingly on the tread of the wheel there is no jolt or jar, as the weight of the load is taken up by a preceding protuberance before it leaves a succeeding one.

Another essential point, more particularly relating to the part-cylindrical or substantially similar protuberances, is their capacity to free themselves from accumulations of dirt, ice, or snow. It has been found by experience that the part-cylinders arranged side by side, as shown and described, prevent the packing of snow or ice between them. Such accumulations are as often as begun cast down and out by the mere rolling of the wheel and the ordinary slight jarring usual to railway-cars in motion.

In order that a firm and certain grip may be taken by the wheel upon the rail, the tops of the protuberances E are crossed by milled lines or cuts of small depth. These cuttings are designated by letter F. They are made, as shown, perpendicular to the sides of the wheel, and therefore not parallel to the sides of the protuberances. The milling cuts F give the actual bearing-surface of the wheel a file-like character, which, in connection with the structure already described, insures the certain grip of the wheel upon the rail in all weathers and under every ordinary condition of railway-work.

Figs. 4, 5, and 6 represent a rail constructed in accordance with my invention. The base of the rail is marked G, its web is referred to by letter H, its flange by letter J, and the tread portion, which possesses the diagonally-disposed part-cylindrical protuberances K, is designated L. Again, the milling M is formed perpendicularly to the sides of the rail and not parallel to the meeting edges of the protuberances K. The advantages possessed by a rail constructed in this manner are the same in nature as those stated for the wheel. The protuberances may be of any chosen dimensions. It is my practice under certain conditions and in certain localities and upon special grades to use both wheels and rails constructed in accordance with my invention. It will be understood that when so employed together the axes of the protuberances of wheel and rail cross each other and do not fall in the same vertical plane, and the result is a smooth even running without jolt or jar.

I am aware that wheels have been constructed having their tread-surfaces formed in various patterns, both straight across the tread and diagonally across it, and I do not claim that feature broadly.

What I claim, and desire to secure by Letters Patent of the United States, is—

1. The wheel or rail tread comprising a series of part-cylindrical protuberances contiguously arranged and diagonally disposed with respect to the face of the wheel, substantially as described.

2. The wheel or rail tread comprising a series of part-cylindrical protuberances formed upon the periphery of the wheel and integral therewith, the said part-cylindrical protuberances being contiguously arranged and diagonally disposed with respect to the face of the wheel, substantially as described.

3. The wheel or rail tread comprising a series of part-cylindrical protuberances contiguously arranged and diagonally disposed with respect to the face of the wheel, the outer portions of the said protuberances being crossed by milled cuttings perpendicular to the sides of the wheel, substantially as described.

4. The wheel or rail tread comprising a series of part-cylindrical protuberances contiguously arranged and diagonally disposed with respect to the face of the wheel, the outer portions of the said protuberances being milled, substantially as described.

In testimony whereof I affix my signature in presence of two witnesses.

BURR CHAS. WM. EVANS.

Witnesses:
J. M. KING,
D. MACON WEBSTER.